United States Patent
Imai et al.

(10) Patent No.: US 8,253,649 B2
(45) Date of Patent: Aug. 28, 2012

(54) SPATIALLY CORRELATED RENDERING OF THREE-DIMENSIONAL CONTENT ON DISPLAY COMPONENTS HAVING ARBITRARY POSITIONS

(75) Inventors: Francisco Imai, Mountain View, CA (US); Seung Wook Kim, Santa Clara, CA (US); Stefan Marti, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 691 days.

(21) Appl. No.: 12/424,117

(22) Filed: Apr. 15, 2009

(65) Prior Publication Data
US 2010/0053164 A1 Mar. 4, 2010

Related U.S. Application Data

(60) Provisional application No. 61/093,651, filed on Sep. 2, 2008.

(51) Int. Cl.
G09G 5/00 (2006.01)
G06T 15/00 (2011.01)
G06T 15/20 (2011.01)
(52) U.S. Cl. .......................... 345/1.3; 345/419; 345/427
(58) Field of Classification Search .................. 345/419, 345/427, 1.3
See application file for complete search history.

(56) References Cited

U.S. PATENT DOCUMENTS

| | | | |
|---|---|---|---|
| 5,275,565 A * | 1/1994 | Moncrief | 434/29 |
| 5,956,046 A * | 9/1999 | Kehlet et al. | 345/502 |
| 7,091,926 B2 * | 8/2006 | Kulas | 345/1.1 |
| 2004/0125044 A1 | 7/2004 | Suzuki | |
| 2005/0168399 A1 * | 8/2005 | Palmquist | 345/1.1 |
| 2010/0045667 A1 | 2/2010 | Kornmann et al. | |
| 2010/0058205 A1 | 3/2010 | Vakil et al. | |
| 2010/0064244 A1 | 3/2010 | Kilpatrick, II et al. | |

FOREIGN PATENT DOCUMENTS

| | | |
|---|---|---|
| JP | 2006-208566 | 8/2006 |
| KR | 10-2008-0069579 | 7/2008 |
| KR | 10-2009-0011316 | 2/2009 |

OTHER PUBLICATIONS

"What is Microsoft Surface?"; http://microsoft.com/surface/Pages/Product/WhatIs.aspx; Jul. 22, 2009; 1pg.
Korean Office Action dated Oct. 10, 2011 from Korean Application No. WA-200812-019-1.

* cited by examiner

*Primary Examiner* — Xiao M. Wu
*Assistant Examiner* — Yingchun He
(74) *Attorney, Agent, or Firm* — Beyer Law Group LLP

(57) ABSTRACT

Two or more display components are used to provide spatially correlated displays of 3D content. Three-dimensional content is rendered on multiple displays where the 3D content refers to the same virtual 3D coordinates, in which the relative position of the displays to each other determines the 3D virtual camera position for each display. Although not required, one of the displays may be mobile, such as a cell phone, and the other stationary or nomadic, such as a laptop. Each display shows a view based on a virtual camera into 3D content, such as an online virtual world. By continuously sensing and updating the relative physical distances and orientations of each device to one another, the devices show the user a view into the 3D content that is spatially correlated. Each device has a virtual camera that uses a common pool of 3D geometrical data and renders this data to display images.

29 Claims, 13 Drawing Sheets

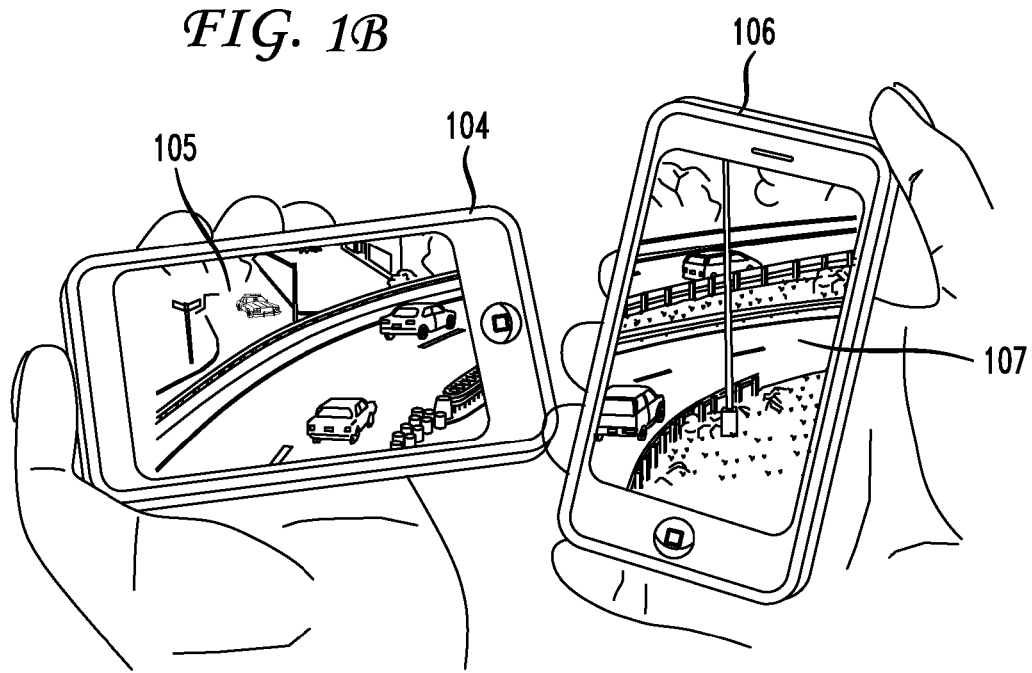

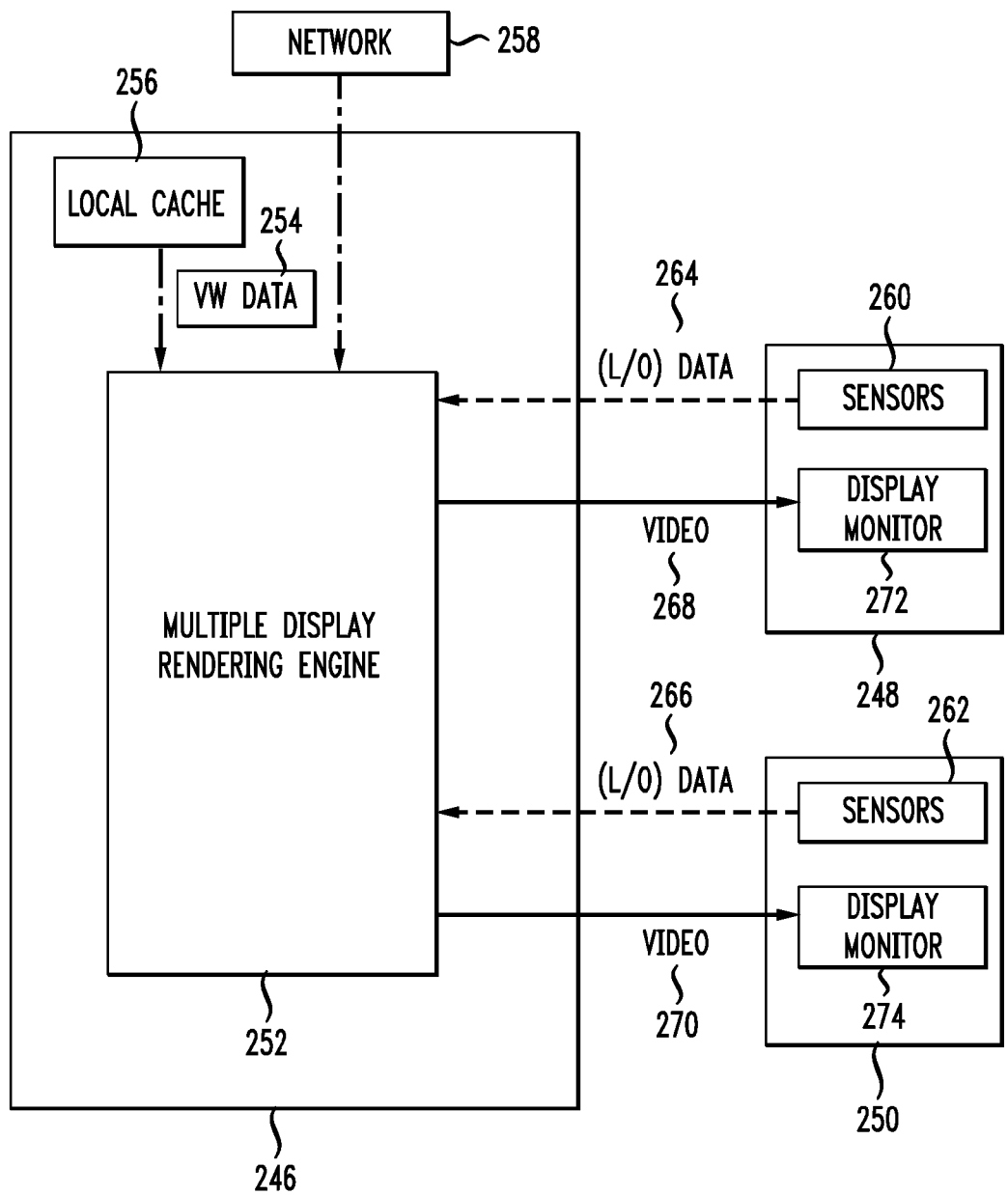

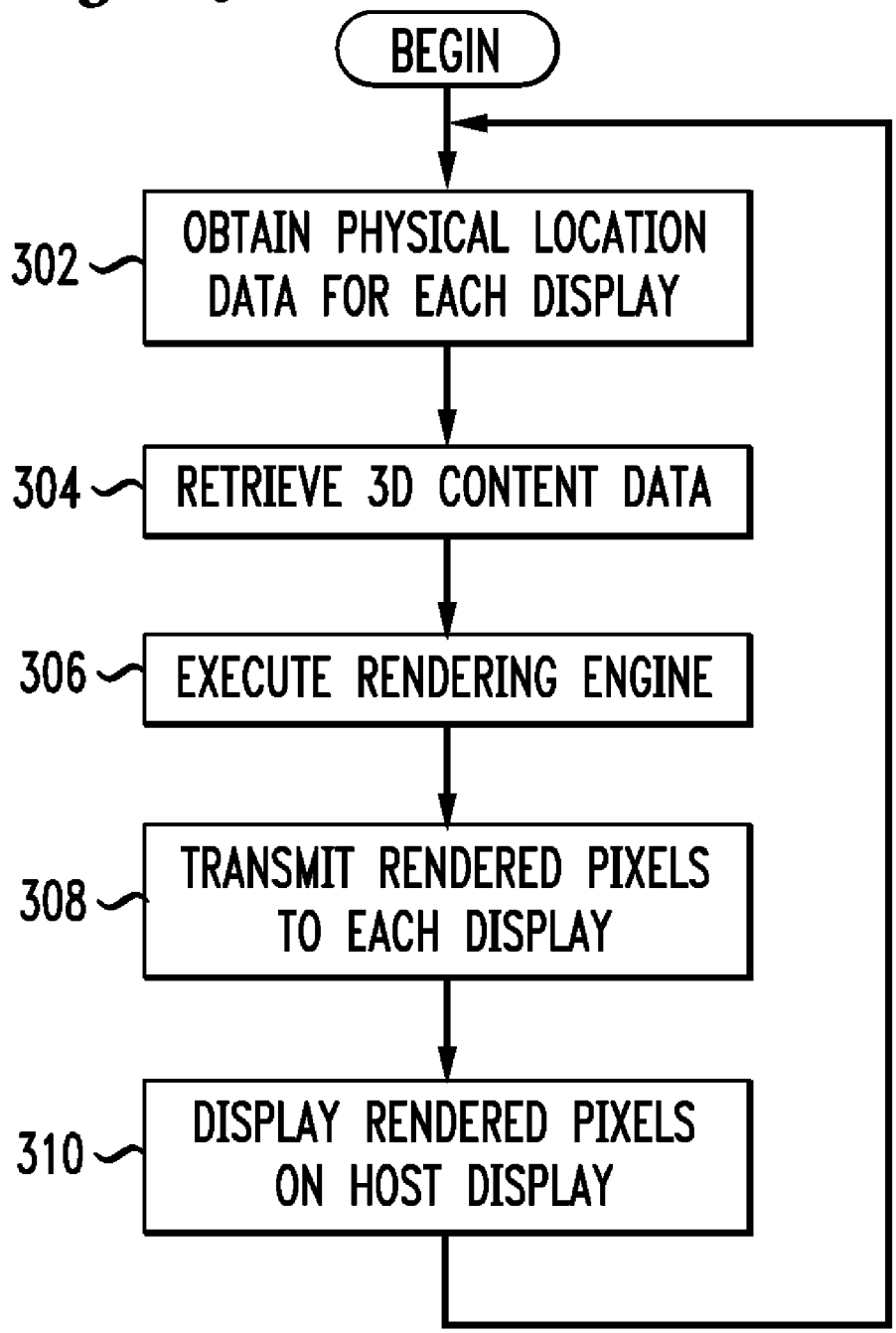

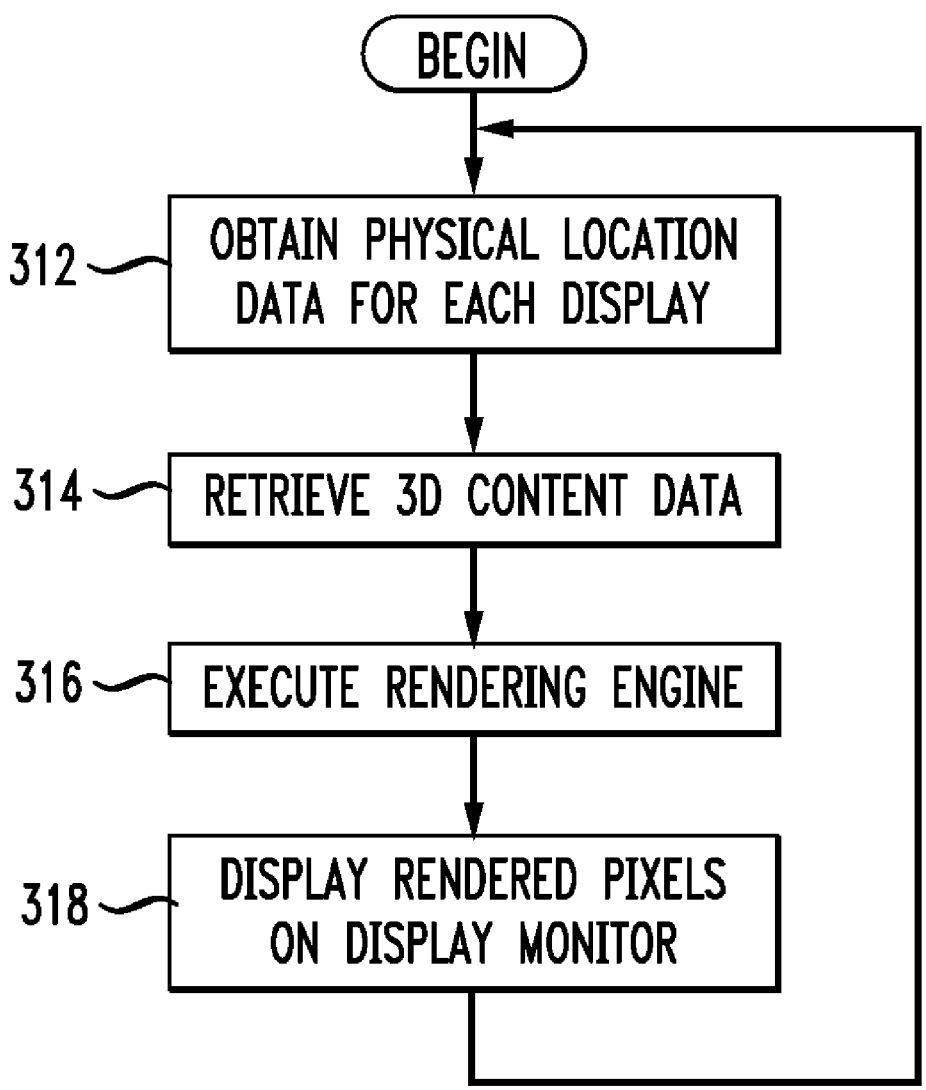

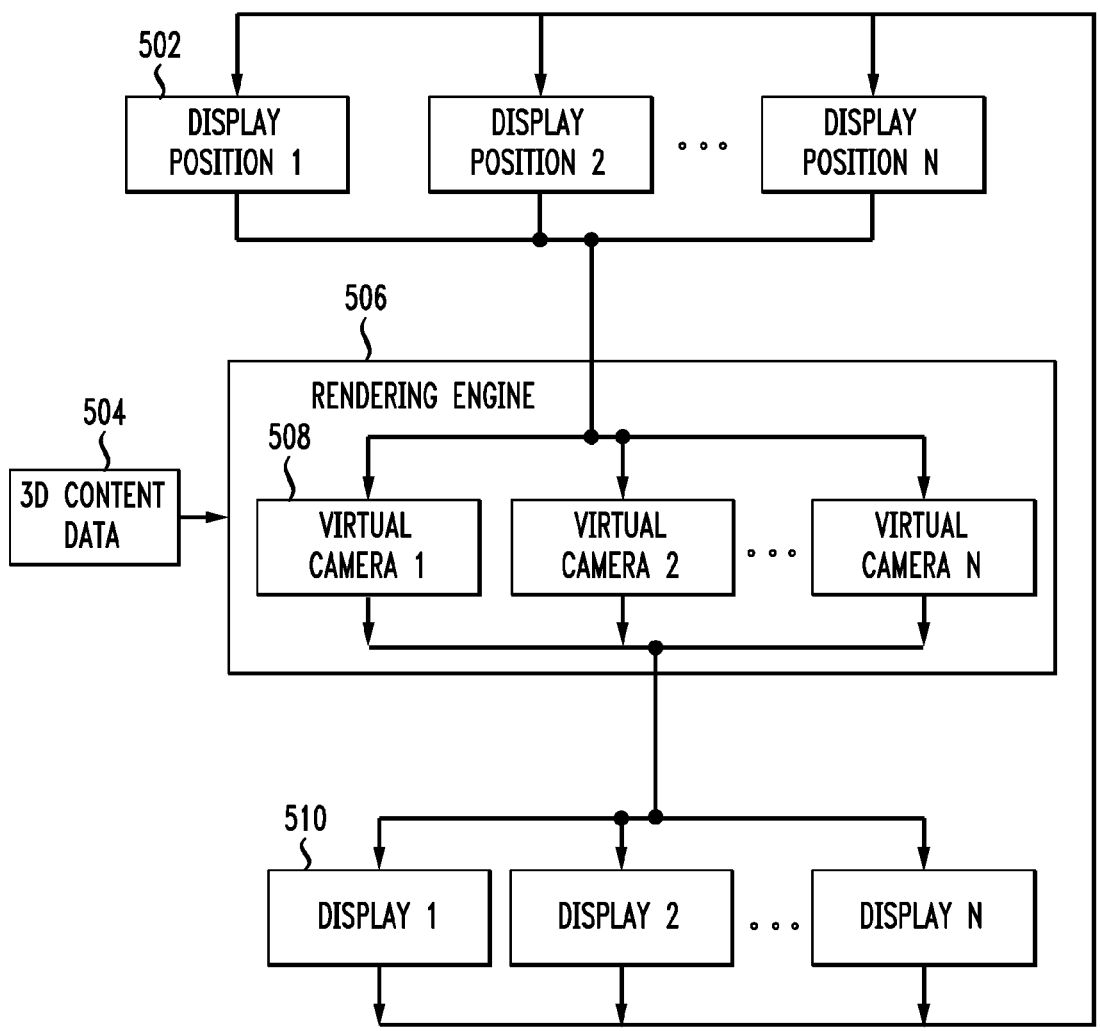

SPATIALLY CORRELATED RENDERING OF THREE-DIMENSIONAL CONTENT ON DISPLAY COMPONENTS HAVING ARBITRARY POSITIONS

CROSS-REFERENCE TO RELATED APPLICATIONS

This application claims priority of U.S. provisional patent application No. 61/093,651 filed Sep. 2, 2008 entitled "GESTURE AND MOTION-BASED NAVIGATION AND INTERACTION WITH THREE-DIMENSIONAL VIRTUAL CONTENT ON A MOBILE DEVICE," of which is hereby incorporated by reference.

BACKGROUND OF THE INVENTION

1. Field of the Invention

The present invention relates generally to systems and user interfaces for interacting with three-dimensional content. More specifically, the invention relates to display systems for enabling users to interact with 3D content on mobile and stationary displays.

2. Description of the Related Art

The amount of three-dimensional content available on the Internet and in other contexts, such as video games and medical imaging, is rapidly increasing. Consumers are getting more accustomed to hearing about "3D" in a growing number of scenarios. For example, 3D content may be found in movies, medical imaging (e.g., examining MRIs), online virtual worlds (e.g., Second Life), modeling and prototyping, video gaming, information visualization, architecture, tele-immersion and collaboration, geographic information systems (e.g., Google Earth), and in other fields. In particular, the popularity of online virtual worlds is on the rise and more users are interacting with virtual worlds through mobile devices, such as cell phones and media players, as well as through stationary, desktop monitors.

However, although the technology behind mobile devices is making them more versatile, they often have relatively small monitors in comparison to stationary monitors. Presently, mobile devices do not provide users who are seeking interaction with three-dimensional content on their mobile devices with a natural, intuitive, and immersive experience. Typically, mobile device displays, such as displays on cell phones, only allow for a limited field of view (FOV), which may be described as the maximum number of degrees of visual angle that can be seen on a display component. This is due to the fact that the mobile device display size is generally limited by the size of the device. For example, the size of a non-projection display cannot be larger than the mobile device that contains the display. Therefore, existing solutions for mobile displays (which are generally light-emitting displays) limit the immersive experience for the user. Furthermore, it is presently difficult to navigate through, for example, virtual worlds or other 3D content via a first-person view on mobile devices, which is one aspect of creating an immersive experience. Mobile devices do not provide satisfactory user awareness of virtual surroundings, another important aspect of creating an immersive experience.

As such, mobile devices, as well as many stationary displays, fall short of taking advantage of 3D content by not providing an immersive user experience, particularly with respect to field of view. Nearly all mobile devices and other present display systems use a single planar screen which has a limited field of view and fail to provide an immersive environment for the user to interact with the 3D content.

Some user interface methods, which can be used with mobile or desktop displays, require wearable heads-up displays or video goggles in order to interact with 3D content, such as entering an online virtual world. However, such head-worn gear is generally socially intrusive and undesirable with many users. Consequently, they have not enjoyed widespread use at home or in the office, let alone in public spaces where many mobile devices are often used.

Thus, it would be desirable to have an immersive and intuitive way of using content displays, whether they are mobile devices, stationary devices or combinations thereof, to interact with or view 3D content.

SUMMARY OF THE INVENTION

Two or more display components are used to display 3D content where the 3D images displayed are spatially correlated. A user can move one of the displays, changing the display's orientation and position relative to another display, and see a view into the 3D content that corresponds to the location of the display's virtual camera. In this manner the displays provide a user with an extended field-of-view when viewing the 3D content which may be, for example, an online virtual world. Generally, a display component may fall into one of three categories: stationary (e.g., a desktop computer), nomadic (e.g., a laptop or netbook computer), or mobile (e.g., a cell phone or handheld media player).

In one embodiment a method of displaying 3D content on a first display component and on a second display component utilizing a host server is described. A host server obtains physical position data of the first component relative to the second component and the physical position data of the second component to the first component. The server transmits a first set of rendered data to the first display component and a second set of rendered data to the second display component. The rendered data sets are displayed on the respective display components. In this manner, the first display component and the second display component provide a spatially correlated rendering of the 3D content. This enables an extended field-of-view for a user viewing the 3D content using the two display components.

Another embodiment is a system of display devices for displaying 3D content. A display device has a location sensor and a monitor. Rendered pixels of 3D content are transmitted from one display device to another device, where the rendered pixels are calculated based on the position data of the receiving device. A transmitting display obtains the relative position data of the receiving device and the receiving device obtains the relative position data of the transmitting device. In this manner, the transmitting device and the receiving device enable a spatially correlated rendering of the 3D content and provide an extended field-of-view for a user utilizing the display devices for viewing the 3D content.

BRIEF DESCRIPTION OF THE DRAWINGS

References are made to the accompanying drawings, which form a part of the description and in which are shown, by way of illustration, particular embodiments:

FIGS. 1A to 1D are illustrations of various configurations of spatially correlated display devices displaying 3D content in accordance with various embodiments;

FIG. 2C is a block diagram of an example configuration having a remote server and two spatially correlated peer display components;

FIGS. 3A to 3C are flow diagrams of processes of spatially correlating multiple displays for rendering 3D content in accordance with various embodiments;

FIG. 5 is an overview block diagram and closed interactive flow of spatially correlating multiple displays for displaying virtual world data in accordance with one embodiment.

DETAILED DESCRIPTION OF THE INVENTION

Systems and methods for creating extended field-of-views (FOVs) for a user interacting with 3D content are described in the figures. The user uses mobile and/or stationary displays to create a larger virtual display space. In this manner the user interaction with the 3D content is enhanced. The user attains a more immersive environment for viewing 3D content by having spatially correlated rendering of the content on the display components.

FIGS. 1A to 1D are example illustrations of configurations of spatially correlated display components for viewing 3D content in accordance with various embodiments. These illustrations show how a user can view 3D content while holding one or more mobile displays, such as a cell phone, next to each other or next to a stationary display, such as a desktop monitor or next to a nomadic display, such as a laptop or netbook, which are portable devices but larger than handheld mobile devices. As the user moves one of the mobile displays, the view or "virtual camera" into the 3D content, for example, an online virtual world, changes in that the mobile display acts as a moveable window allowing the user (in the physical world) to be in or view a virtual world or other 3D content. As the user moves a mobile display component in her physical environment she sees different contiguous views of scenes in the virtual world. Another way is to describe it is as a picture of a virtual world environment behind the display devices which is only viewable through the display.

Figure 1A:
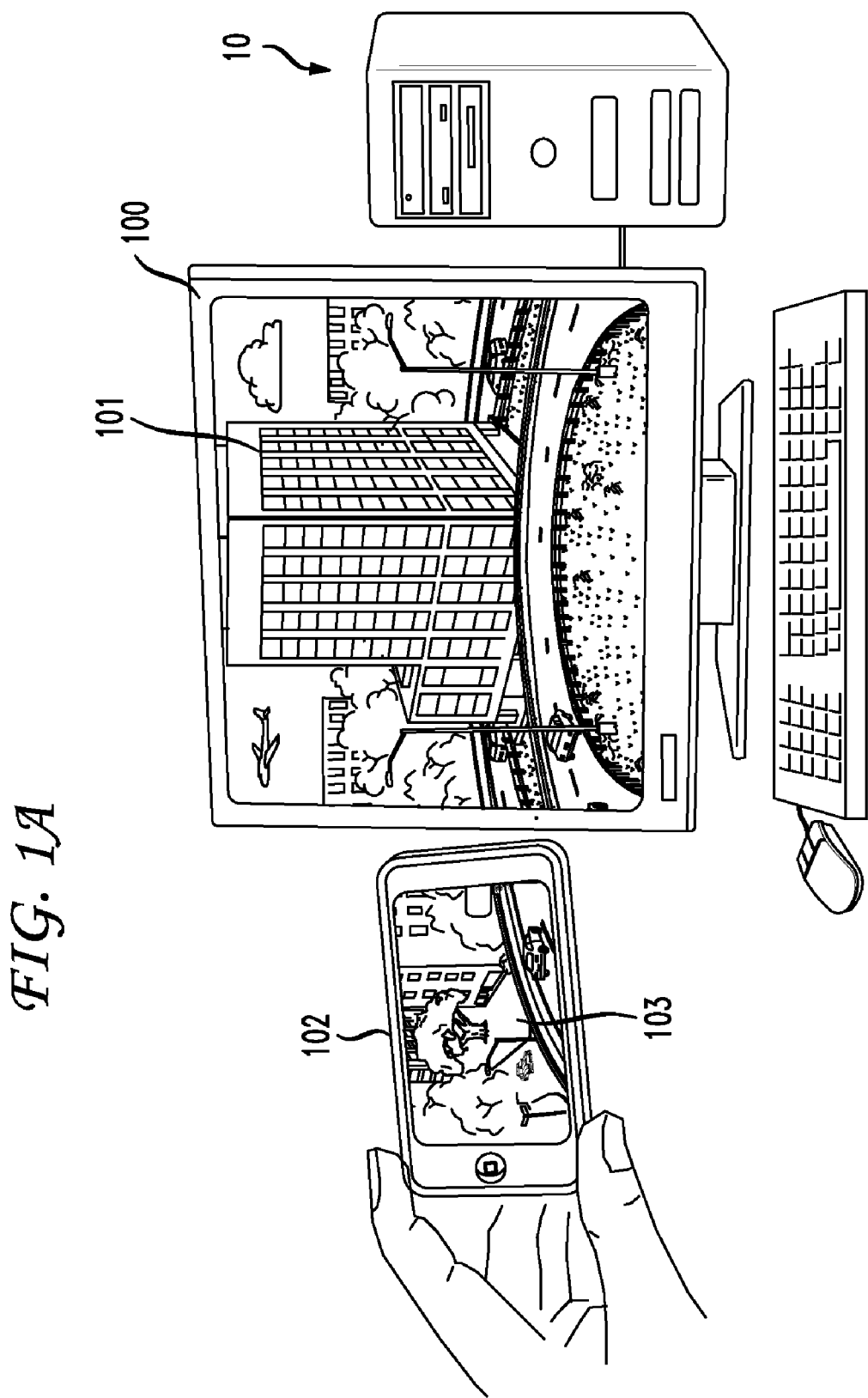

FIG. 1A shows a stationary display component 100, specifically, a desktop monitor connected to a computer 10 and a mobile display component 102, specifically, a cell phone having a display. Component 102 may be any type of mobile handset or other display device, such as a "mini" laptop, portable game console, and the like. Details on the internal components and modules of mobile display component 102 and computer 10 are described in greater detail below. Stationary display component 100 displays a virtual world scene 101 and mobile display 102 has a virtual world scene 103. The two scenes are part of the same larger virtual world image. Scene 101 shows a curved road. A continuing portion of virtual image 101, that is, of the curved road, is scene 103, shown on mobile display 102. If mobile display 102 is moved further to the left, the objects and scenery that continue to the left of scene 101, such as the rest of the road can be viewed. If mobile device 102 is moved up or angled so that screen is facing down, the user may see the sky, the top of a building, trees, and the like. As described below, there may be multiple stationary displays or multiple mobile displays.

FIG. 1B is a similar illustration showing a configuration having two mobile display devices 104 and 106. A virtual world scene 105 is displayed on device 104 and scene 107 is displayed on device 106. The two scenes show the same virtual world environment but have different virtual cameras into this environment. If one or both of the devices are moved, the user will see a different portion of the virtual world. As discussed below, the two display devices are spatially correlated (or physically correlated) so that they show portions of the virtual world that are relative to each other. Thus, if they are moved closer to each other, scenes 105 and 107 will look more continuous or connected. In one embodiment, the spatial correlation of the two display devices is possible as long as the two devices do not overlap. The configuration shown in FIG. 1B is only one example. In other embodiment, there may be multiple mobile displays.

Figure 1C:
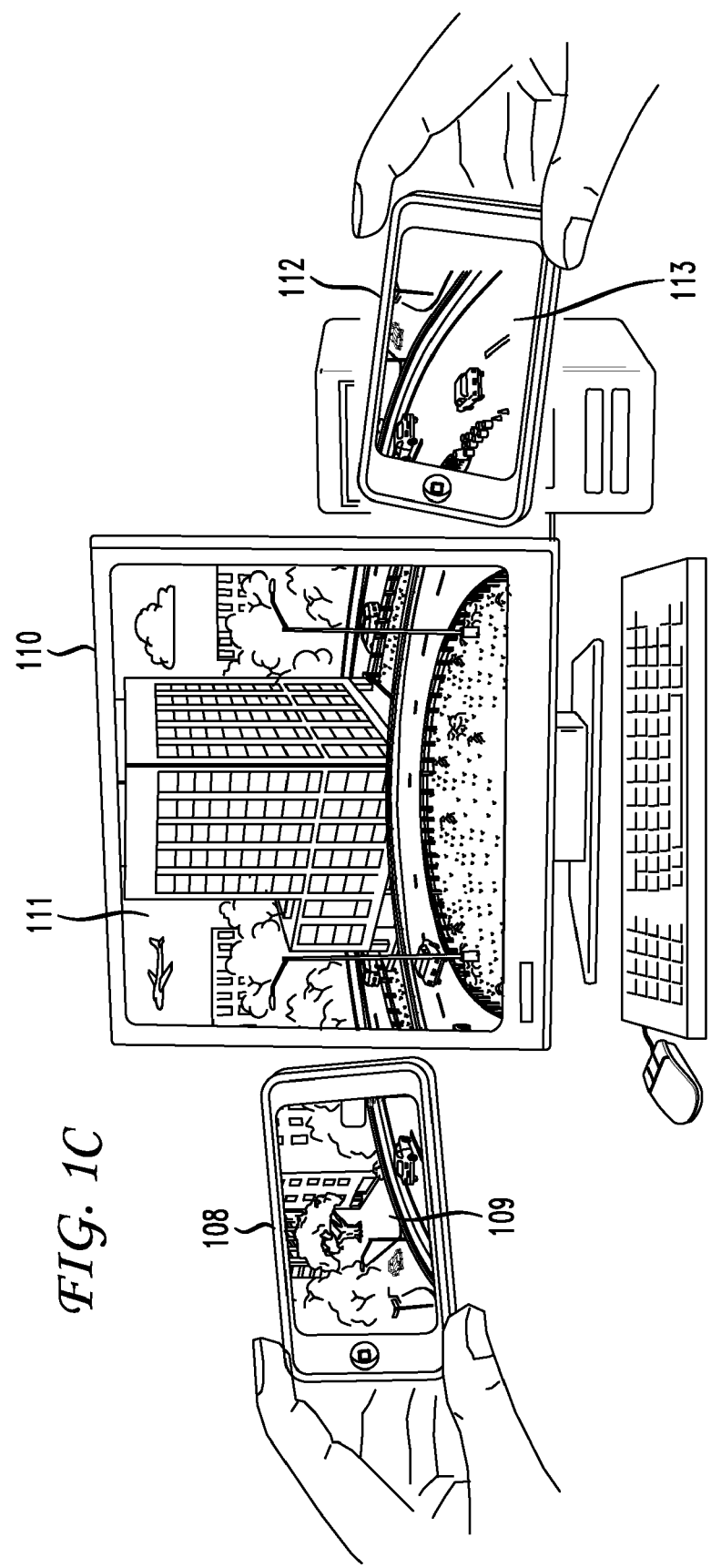

FIG. 1C shows another possible configuration of three display devices for viewing virtual world content using spatial correlation. Two mobile display devices 108 and 112 are shown with a stationary display device 110. A virtual world scene 111 on stationary display 110 is in between scenes 109 and 113 on mobile display devices 108 and 112, respectively. When a user moves either mobile device or both, different scenes of the virtual world are shown. If mobile device 108 is moved to the left, objects and scenery to the left of scene 111 on stationary display 110 (and to the left of scene 113) are shown. If device 112 is moved to the right, objects and scenery of the virtual world to the right of scene 111 (and of scene 109) are shown. The mobile displays may also be moved up or down to show scenes in the virtual world that are above or below the current viewing level.

Figure 1D:
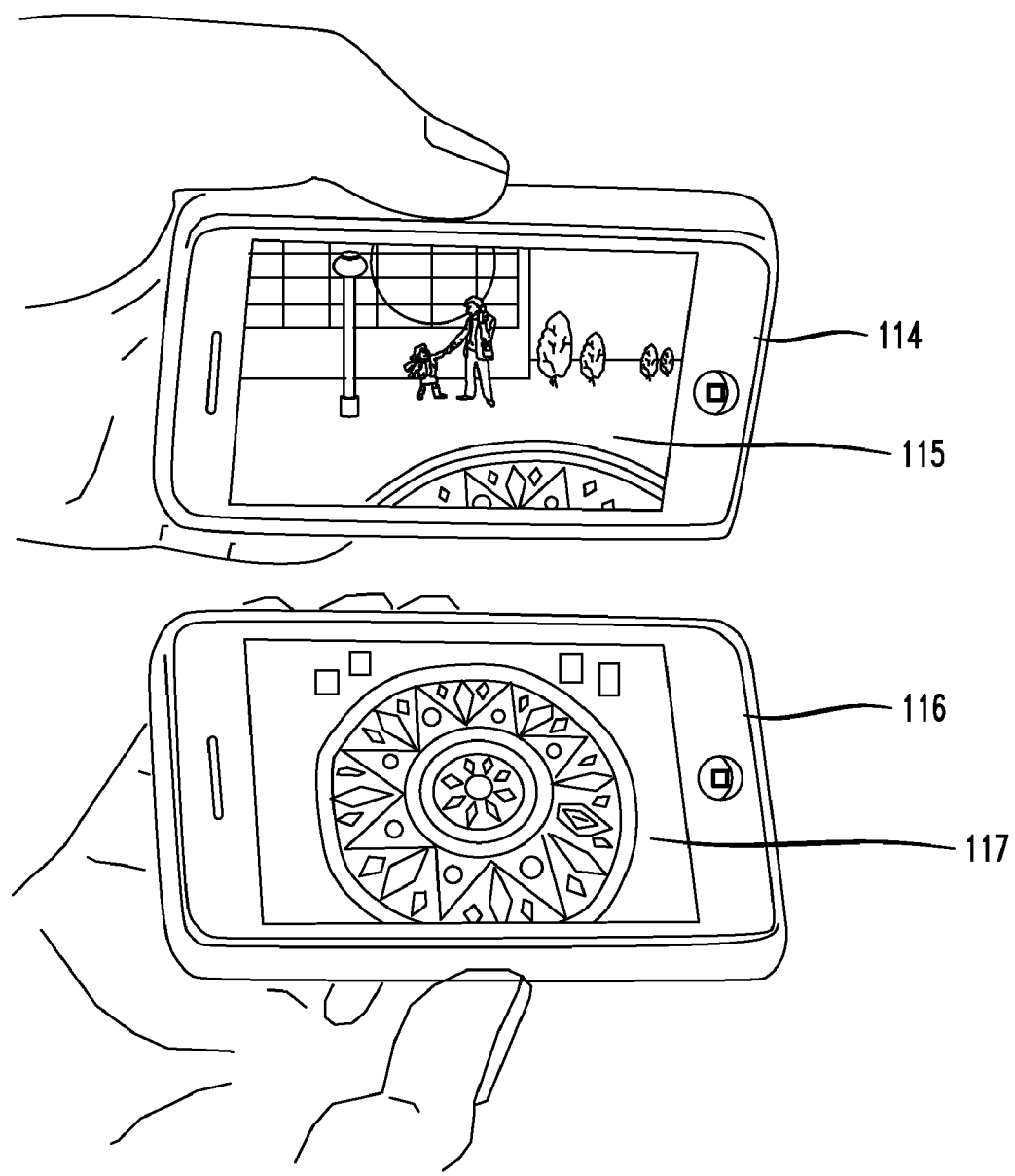

FIG. 1D shows another possible configuration of two spatially correlated mobile display devices 114 and 116 in a somewhat different configuration from those shown in the other figures and uses a different virtual world scene. A virtual world scene 115 of a mosaic on the ground is shown at a specific angle in display 114 and is "above" a virtual world mosaic scene 117 shown on display 116, which is below or, in this case, showing the mosaic on the ground and as a continuation of the portion of the mosaic shown in scene 115. As described above, the user can move either display device to show other parts of the virtual world. For example, the devices can be moved to the configuration shown in FIG. 1B. It should be noted that the virtual world environment is generally the same in all the scenes shown in FIGS. 1A to 1C and that the scene shown in FIG. 1D is different to better illustrate the how the user's FOV is extended when the user holds two mobile devices in the specific configuration shown (i.e., at an angle of roughly 110 degrees to each other).

These four example configurations of display devices show how the spatially correlated displays may be used to create an extended FOV for the user viewing 3D content. This extended FOV provides an immersive environment for the user when interacting with the 3D content. It may be characterized as an extended "virtual" FOV in that the user is able to see more of the 3D content by moving the displays and may create the impression that the user is standing in or immersed in the virtual world. As is evident from the examples above, an extended FOV may be physically discontinuous, that is, have gaps or breaks in the view of the 3D content. As the figures clearly show, there are spaces between the displays that create physical discontinuities. However, the spatial correlation still provides the viewer with an extended view of the 3D content as described in greater detail below. Other configurations may include the use of nomadic display components, such as regular size and mini laptops and netbooks, which are not as portable or mobile as handheld devices, but can be moved by a user to show different views into 3D content. As described below, stationary display devices, nomadic display device, and mobile display devices may have different internal components, such as various sensors and rendering engines. Other types of components do not have a display (or monitor) and are not shown in FIGS. 1A to 1D, but have other functions, such as storing 3D data or performing data rendering functions, as described below. As noted, other configurations may include multiple devices (more than three), for example, four or more mobile devices held by two or more users to view a virtual world.

It is helpful to note that an extended FOV is, in one embodiment, the maximum number of degrees of visual angle that can be seen on a display component. As noted below, other embodiments of the system may include bare-hand manipulation of 3-D objects, making interactions with 3-D content not only more visually realistic to users, but more natural and life-like. In another embodiment, this manipulation of 3-D objects or content may be augmented with haptic (tactile) feedback, providing the user with some type of physical sensation when interacting with the content. In another embodiment, the interactive environment described in the figures may also be used to display 2.5-D content. This category of content may include, for example, an image with depth information per pixel, where the system does not have a complete 3-D model of the scene or image being displayed. Thus, an extended FOV is a FOV that exceeds or extends the FOV of conventional planar display (i.e., ones that are not unusually wide) viewed at a normal distance.

Spatial correlation, as this concept is used in the above descriptions, may be implemented in various ways. In one embodiment, spatial correlation includes the continuous updating of relative physical positions and orientations of display devices. That is, the relative physical positions and orientations of devices to each other are continuously sensed and each device is updated. This physical position and orientation data may be used as input to virtual cameras to render 3D content on each display and may be used to define virtual positions and orientations of the respective virtual cameras, where each device has one virtual camera. This mapping of physical position and orientation information to virtual position and orientation information may be ruled by a well-defined set of transformations. In many cases, a transformation may be a one-to-one homogeneous and isotropic mapping in Euclidian space. Each virtual camera uses a common pool of 3D geometrical data and renders this data in order to display images.

In another embodiment, spatial correlation may be extended to include heterogeneous transformations. For example, with two displays, one may have a zoomed-in (or telescopic) perspective while the other display may provide a normal view. In another example, geometric transformations or other transformations that are not restricted to Euclidian space, such as ones based on hyperbolic, elliptic or Riemannian geometries, may be used (the later geometries are particularly suitable for curved display spaces). In yet another example, anisotropic transformations, which take into account distortions of wide-angle lenses and curved display spaces, may be used for spatial correlation. In these heterogeneous transformation examples, when displays are moved in physical space, the displayed images are updated based on the relative distance and orientation of the devices. However, each virtual camera may use anisotropic transformations, non-Euclidian geometry, or heterogeneous transformations for each device.

Another embodiment of spatial correlation may include display encoding. The embodiments above primarily consider color displays that use the same image encoding. However, each display may have a different image encoding, such as but not limited to X-ray view, infrared view, color view, or B/W view. In this case, displays may be spatially correlated while in multi-rendering modality use. Other embodiments may involve more complex cases which involve a combination of multi-rendering modality and heterogeneous transformations.

Figure 2A:
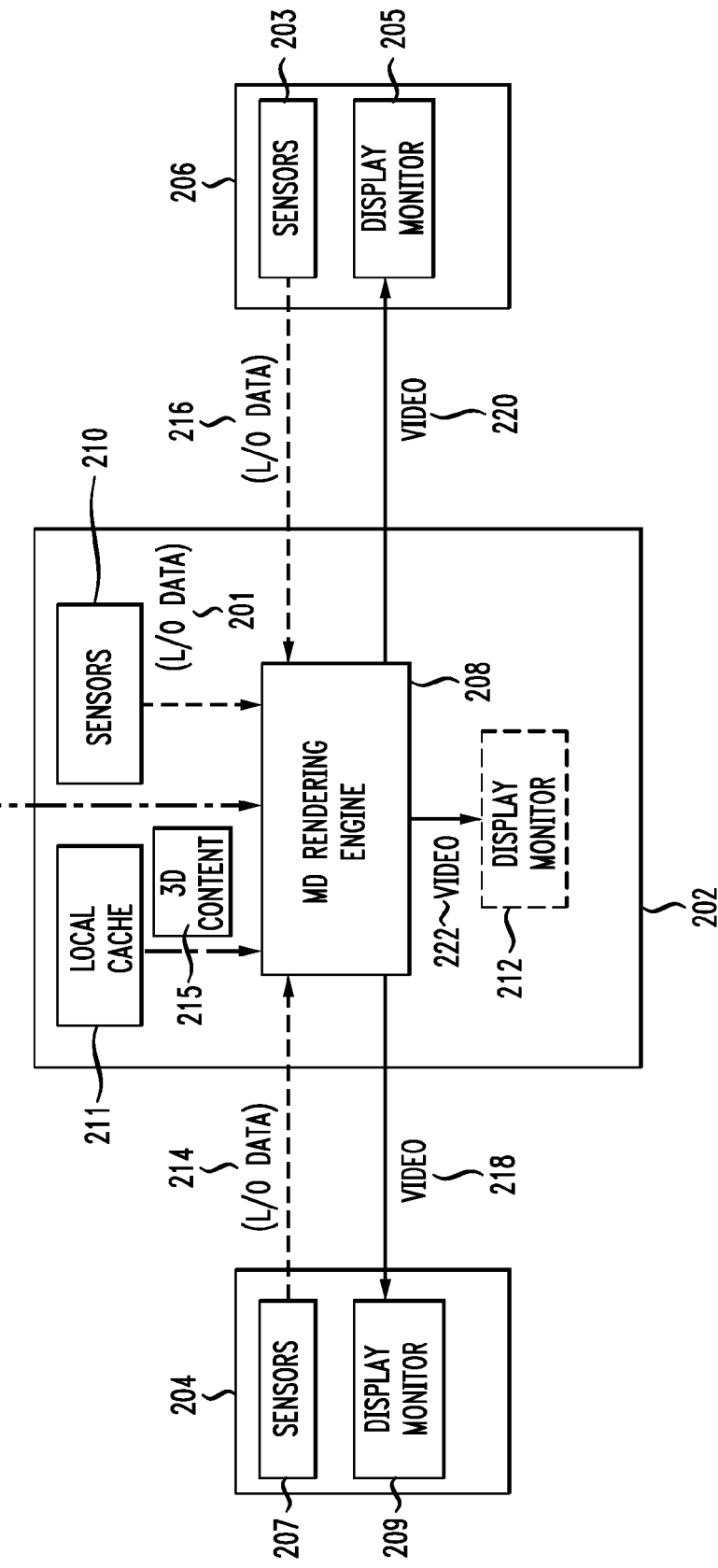
FIG. 2A is a block diagram of an example configuration having three spatially correlated display components.
Figure 2B:
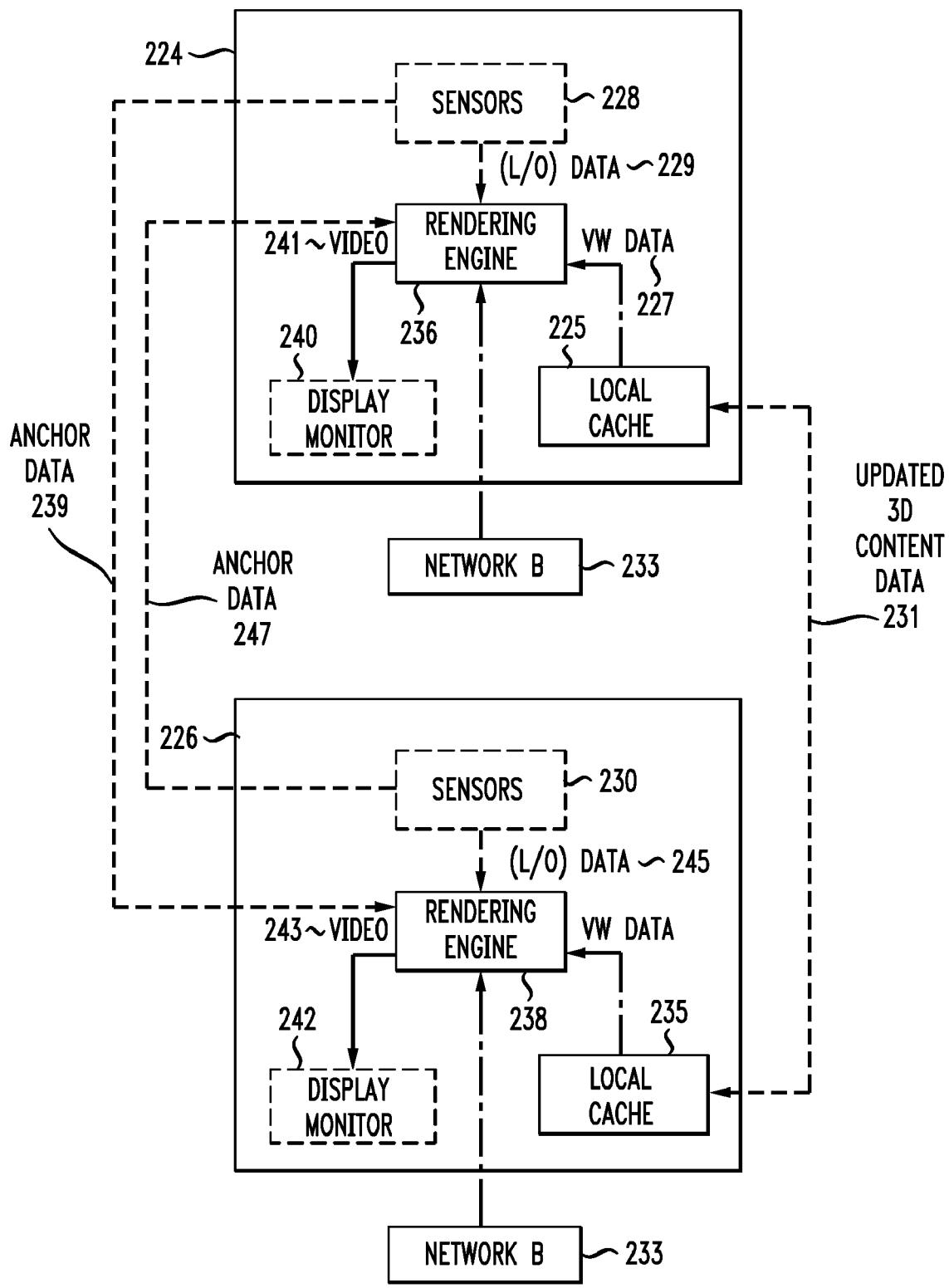
FIG. 2B is a block diagram of an example configuration having two spatially correlated peer display components.

FIGS. 2A to 2C are network diagrams showing example configurations and relationships among display components for rendering 3D content in accordance with various embodiments. FIG. 2A is a block diagram of one example configuration having three display components (for ease of explanation a display component may be referred to as "display"). In this example, one display, functions as a primary or host display and has a 3D data rendering engine while the other secondary displays do not. Examples of this configuration are shown above in FIGS. 1A and 1C, where the desktop monitor and computer comprise the primary display and cell phones 102, 108, and 112 are the secondary displays.

In FIG. 2A, a network 200 has a host display 202 in communication with two secondary displays, 204 and 206. In other embodiments, primary display 202, in this case a stationary display, may be in communication with only one secondary display (e.g., FIG. 1A) or more than two. The same concepts and methods illustrated in network 200 may apply in these other possible configurations. Host display 202 has a multiple-display rendering engine 208. Also shown are location sensors 210 and a display monitor 212. Location sensors 210 may also be characterized as relative position sensors in that they provide the physical position of the (host) display device relative to other displays in proximity to the host display (the term "location sensor" is used herein). It is also worth noting that another type of sensor is an egomotion sensor or detector which provides data regarding motion of the host display relative to the physical ("real") world. These detectors may use techniques such as optical flow or inertial measurement. Their use and context are described in detail below.

Host display 202 is in communication with mobile displays 204 and 206. This communication may be wired or wireless using known protocols. In one embodiment, location sensors 210 in host display 202 detect the physical position of displays 204 and 206 relative to host display 202 or to each other. In another embodiment, relative physical position data is sent from secondary displays 204 and 206 to host display 202 using sensors 203 and 207 in the secondary displays. These sensors are described below. In other embodiments, the secondary displays may be passive devices in that they may not have their own sensors, specifically, location sensors. Host display 202 may use its own sensors to determine the relative position of the secondary displays. Position data may be comprised of location data (e.g., coordinates of the display component in the physical or "real world" space in relation to host display 202). The transmission of position data is represented by transmission 214 from display 204 to display 202 and transmission 216 from display 206 to display 202. Position data may also include orientation data reflecting the angles at which the display is oriented or held. For example, orientation data may be represented as three orthogonal angles, yaw, pitch, and roll. However, regardless of the specific implementation or format of the position data, shown as "L/O data" (location/orientation data) that is either detected/sensed by host display 202 or sent by one of the secondary displays, the position data represents the position of a secondary display with respect to a host display. In one embodiment, the position data does not represent a so-called "absolute" position of the display, such as absolute positioning data used in GPS and other systems. In one embodiment, the only positioning information that is needed and that is relevant for the spatial correlation of displays is positioning data of the displays with respect to each other, that is, the displays' relative position data.

Host display 202 obtains relative physical position data 214 and 216 of displays 204 and 206, respectively. Position data 214 and 216 are processed by multiple-display rendering engine 208 which outputs rendered pixel data of the 3D content to be shown on the displays. Engine 208 may also receive position data 201 providing the position of the host device itself relative to the second displays. This data may be obtained using sensors 210, which may include an egomotion sensor and various types of location sensors. The transmission of rendered pixel data, which may take the form of a video stream, are shown as video data 218 from host display 202 to display 204 and video data 220 to display 206. In this embodiment, rendering engine 208 is able to render pixels of 3D content for display on multiple displays and, through suitable communication means, transmit the rendered pixels in the form of a video stream to the secondary displays, which, in this configuration, do not have their own rendering engines. It should be noted that multiple-display rendering engine 208 also renders pixels of 3D content for host display 202 which is displayed on monitor 212. The video stream is shown as video data 222. Video streams 220 and 218 are displayed in display monitors 205 and 209 on the displays. As noted, displays 204 and 206 may be media players (e.g., MP3 players), cell phones, handheld computing devices, netbook computers, laptop computers, "smart" handset devices, and so on. Three-dimensional content data 215 may be stored in a local memory 211, such as a cache memory, or may be retrieved from one or more network components 213. For example, it may be retrieved from a server "cloud" or from a single mass data repository. The 3D content may reside in both local memory 211 and network 213.

Figure 4:
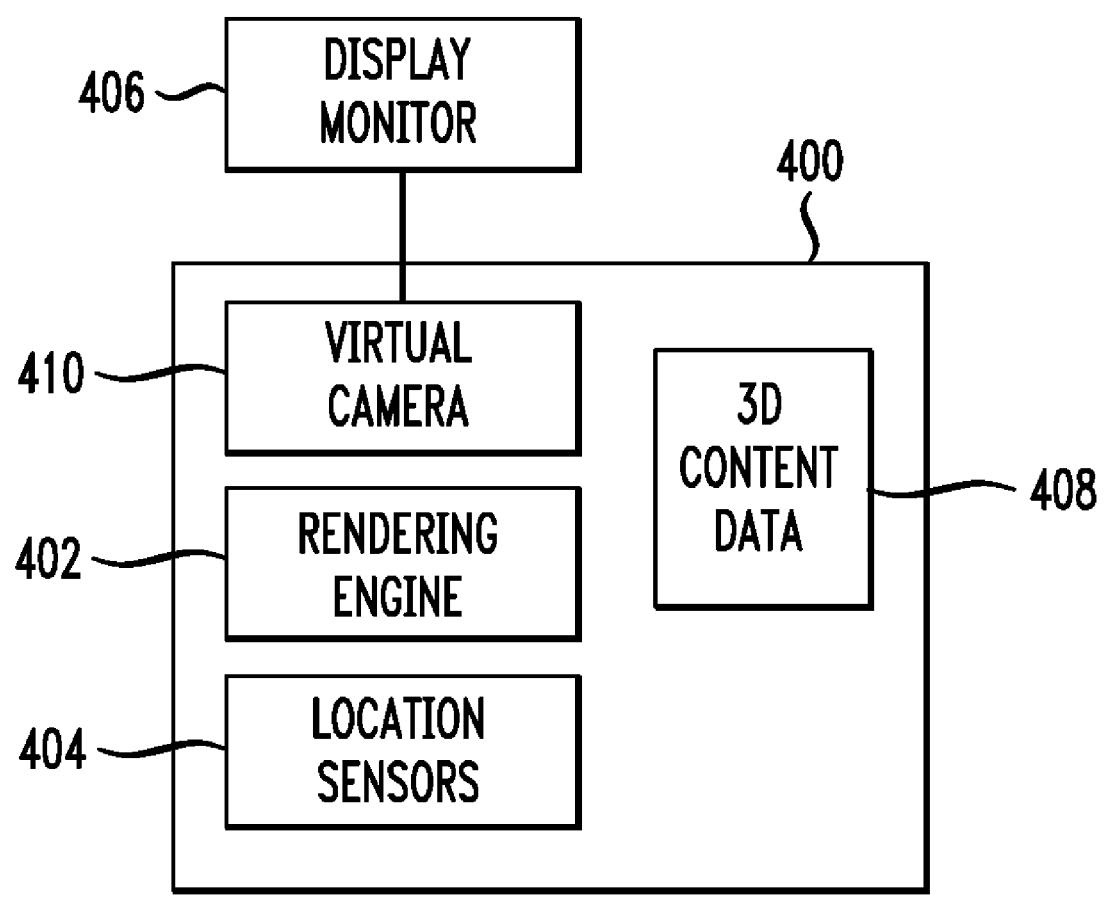
FIG. 4 is an overview block diagram of a display component in accordance with one embodiment.

An overview description of a display component in accordance with one embodiment is shown in FIG. 4. A display component 400 has a rendering engine 402, which may be a multiple-display engine as engine 208 in host display 202, or may be a single-display rendering engine, described below in FIG. 2B. Also shown are one or more location sensors 404 and a display monitor 406, such as an LCD monitor. There are various solutions for implementing location sensors, also referred to as localization sensors. They include inertial sensors, optical cameras with object detection, IR cameras with markers, active markers, close range ultrasonic transducers, multiple frequency emitters/receivers, and Bluetooth signal intensity for measuring distance. As noted, some displays may not need location sensors. Display 400 may also have an egomotion detector for obtaining its own position data. Display component 400 shows 3D content 408 stored in a memory (not shown) in display 400. Data 408 implementing 3D content is similar to data stored in a conventional CAD/CAM system for representing objects. As described below, 3D content data 408, which is the same on all display components (e.g., displays 202, 204, and 206), may also be stored in each display memory. That is, each may have a complete "copy" of the complete 3D content, such as virtual world content. They synchronize 3D content data when there is a change in the content, such as an avatar walking, a car moving, etc. In another embodiment, only one display has all 3D content data 408. For example, host display 202 may store all the content, or retrieve it from the network, and secondary displays may not store any 3D data, but rather receive video streams (rendered pixels) 218 and 220.

Also shown in display component 400 is a virtual camera component 410. Virtual camera 410 may be implemented by a graphics controller (not shown) that provides graphics data to display monitor 406. Virtual camera 410 may be described as providing a window or viewing lens into the 3D content. For example, in FIGS. 1A to 1D, each display may be characterized as providing a view or window into the virtual world, each showing a different part of the virtual world environment. Virtual camera 410 provides this view into the virtual world and, as noted, may be implemented using a graphics controller hardware component, or other suitable graphics subsystem in display 400. The rendered pixels (i.e., video data 218, 220, and 222) shown in FIG. 2A shows the perspective of the 3D content displayed through the virtual camera on each display. As each mobile display is moved around, its virtual camera shows a different part of the 3D content. As noted, not all displays may have all the components, sensors, and data shown in display 400. For example, some may not have rendering engine 402 or display monitor 406.

Referring back to FIG. 2A, a flow diagram process associated with the configuration shown is described in FIG. 3A. FIG. 3A is a flow diagram of a process of spatially correlating multiple displays for rendering 3D content in accordance with one embodiment. Some of the steps described here were previously noted in the discussion above with respect to FIG. 2A, showing a host display and two secondary displays implementing an immersive environment for the user when interacting with 3D content. A process and its alternatives shown in FIG. 3A are described as actions taken on the host display (i.e., from the host display's "perspective").

At step 302 the host display obtains relative physical position data for each secondary display. The physical position data may include a location data component which provides coordinates of a secondary display with respect to the host display. Position data may also have an orientation data element which provides angular data (yaw, pitch, roll) of the mobile device indicating the angles at which the display is oriented with respect to the host display. The position data may be obtained by the host display by using conventional location sensors on the secondary display and/or on the host display. In another embodiment, the secondary display may calculate its own position with respect to the host and transmit this relative position data to the host display. As is known in the art of sensing technology, there are conventional techniques that may be used to determine the relative positions of devices (i.e., objects) with great accuracy. A list of localization sensors was provided above. These may involve the use of egomotion sensors to measure the position of the host device relative to the physical world. As is known in the art, there are various combinations and configurations of sensors (egomotion, localization, etc.) that enable a host display (or a peer display, discussed below) to obtain the relative physical positions ("L/O data" or location/orientation data) of nearby displays.

At step 304 the host display retrieves 3D content data from memory. As noted above, depending on the configuration, this data may be stored in a local cache on the host display or on distributed network components. Although the data is described as being "retrieved," it may be characterized as being taken from memory and used as input to the rendering engine. At step 306 the rendering engine on the display executes. In the described embodiment, the rendering engine is a multiple-display engine which accepts as input the 3D content. As noted above, this data may be in a format similar to, for example, the format used to store data in a CAD/CAM system. A multi-display rendering engine software module also takes as input relative physical position data of the secondary displays in the real world relative to the host display (as obtained at step 302). Thus, if there are four secondary displays, the rendering engine may receive as input five sets of positioning data, one for each secondary display and positioning data for itself. The rendering engine accepts as input this positioning data and the 3D content data (e.g., virtual world data) and generates rendered pixels in the form of a video stream for each of the displays. The rendered pixels are transmitted to each secondary display at step 308, as well as to the host display. These pixels display the 3D content on each display from the perspective of each display. In this manner, they provide a different view of the virtual environment represented by the 3D data. As noted, this perspective may be described as a virtual camera view. In one embodiment none of the displays overlap each other and each display provides a different view of the virtual environment.

At step 310 the rendered pixels for the host display are displayed on the host monitor. At this stage each display is displaying a segment of the virtual world, thereby providing the user with an extended virtual FOV creating an immersive environment. The process repeats by returning to step 302 where the physical positions of each of the secondary displays are obtained again. This loop may be repeated numerous times per second as suitable given the processing and memory resources of the host display and of the secondary displays. In this manner, 3D content is displayed on each of the display components based on the components' positions relative to the host display as the user moves the displays.

FIG. 2B illustrates another configuration of two display components performing spatial correlation in accordance with one embodiment. In the configuration of FIG. 2B, neither display is a host display. It may be characterized as a peer-to-peer architecture where each display has generally similar sensor and processor capabilities, although they may vary. Each display performs its own pixel rendering. A display 224 and a display 226 obtain relative position data of the other display using location sensors 228 and 230. As noted, these sensors may include egomotion sensors, which perform as an "anchor" to the physical world. Some or all of the displays may have an egomotion sensor, but at least one should. As noted above, location sensors may be any one of a number of conventional sensors and may implement known techniques for sensing or detecting the location of nearby displays. Updated 3D content data 231, which may be in a format similar to, for example, the format used to store geometrical data in a CAD/CAM systems, is exchanged between each of the displays. This exchange of updated 3D content data is necessary since one display may change the existing 3D data (e.g., when the user is interacting with the virtual world and changes objects in the virtual world), and ensures that all displays are using always the most up-to-date 3D content data.

Also shown in displays 224 and 226 are single-display rendering engines 236 and 238, respectively. Each of these software modules render pixels of the 3D content, that is, specifically for each display's virtual camera, or perspective, into the virtual environment. Updated 3D content data 231 is exchanged between caches 225 and 235. Only the caches or other memory components are updated or receive updated 3D data (and not the rendering engines) since the connection only transmits 3D content that has been changed by one display. The rendering engines may retrieve the data from the local caches. Sensors 228 and 230 on the devices provide position of the devices themselves. The sensors also detect the locations of the devices relative to each other. The rendering engines also accept as input the 3D content. The 3D content data may be stored on a local memory, such as local caches 225 and 235, or be retrieved from network components 233. The software rendering engines use these inputs, for example data 227 from local cache 225 to 236, and render pixels for each respective display monitor. Single-display engine 236 transmits rendered pixels to display monitor 240 and engine 238 transmits pixels to display monitor 242. A single-display rendering engine needs the position data of the one or more other "peer" displays (in the example shown in FIG. 2B there are only two peer displays) so that each engine can determine which segments of the virtual environment should be shown on the display monitors. By using this information, it can determine what segment of the virtual world to show the user, thereby maintaining a spatial correlation among the displays and providing an immersive environment for the user.

In another embodiment, at least one of the display devices functions as an "anchor" in the real world. That is, the display device anchors its own position in the physical environment. If all the displays are able to anchor their positions, the devices do not need to exchange location and orientation data with each other. In FIG. 2B anchor data 239 for display 224 is transmitted to rendering engine 238 of display 226 and anchor data 247 for display 226 is transmitted to rendering engine 236 of display 224. If only some of the displays anchor their position in the physical world, the ones that do may need to transmit anchor data to "unanchored" displays which are only aware of their relative position towards the other displays. If one display has no sensors of any type and receives its own relative location and orientation data from a peer display, this relative L/O data may be in real world units. For example, a display with sensors may transmit to a display without sensors information such as distance, for example, 1.25 meters, from another display, at a horizontal and vertical heading angle of M and N, and the relative angular orientation towards a peer device is X, Y, and Z.

Processes for displaying 3D content on peer displays shown in FIG. 2B are described in the flow diagram of FIG. 3B. Many of the steps shown in FIG. 3B are similar to those described in FIG. 3A. The steps described are taken on either one of the two or more peer displays. The displays do not have to be peers in the conventional sense, that is, they do not have to have similar size or processing and memory resources. Rather, they are peers in that none performs rendering for another or stores all the 3D content to the exclusion of others. In this configuration, one display may be a laptop computer, another, a cell phone, and yet another, a media player. Each of these has different processing capabilities, memory, and monitor size. At step 312, a display obtains or acquires the relative physical locations of the other displays. It may do this using its own location sensors or may receive the position data from a display (the relative position data is "pushed" to it). Again, the position data it receives provides positions relative to the display itself, in contrast to absolute position data. This position data may be received via wireless or wired means and may be received using a suitable interface on the display, which may vary widely. Note that the display may also be transmitting its relative position to numerous other displays or other displays may be using their location sensors to detect its physical position relative to the physical positions of the other displays. In these embodiments, absolute positioning data of the displays (e.g., GPS data) are not needed.

At step 314 3D content representing, for example, a virtual world is retrieved from memory on the display or from the network and input to a single-display rendering engine. At step 316 the rendering engine executes accepting as inputs the 3D content and the physical position data of the other displays obtained at step 312 and of the engines' resident display. At step 318 the rendered pixels of the 3D content created by the rendering engine are displayed on the display monitor.

FIG. 2C is a block diagram showing another configuration of spatially correlated displays and a non-display component in accordance with one embodiment. A remote server 246 is in communication with two mobile display devices 248 and 250. In the described embodiment, server 246 does not have a display or may have one but, for illustrating this configuration, is not spatially correlated with the displays of devices 248 and 250. The primary role of remote server 246, which may be operated by a service provider or other third party, is to operate and maintain a multiple-display rendering engine 252 for creating rendered pixel data for mobile displays 248 and 250. Server 246 receives 3D content data 254 from a local memory 256 or from another network component 258, such as a mass storage device that stores 3D content for, example, multiple virtual worlds. In another embodiment, the 3D content data may be obtained from both local memory 256 and from an external network component 258.

In another embodiment, sensors 260 and 262 are in server 246. In this embodiment, mobile displays 248 and 250 are passive and have no need to transmit L/O data 264 and 266 to server 246. In this embodiment, sensors on server 246, such as a camera, tracks the mobile devices or devices that look like a mobile device. It may look for markers using infrared tracking and determine the orientation and position of each of the devices. In this embodiment, server 246 is in proximity to mobile displays 248 and 250 so that server 246 can track their positions. In another embodiment, a remote server receives L/O data from sensors located in the environment or general surroundings in which displays 248 and 250 are used, such as a network of sensors in a room.

Mobile display device 248 may be similar to mobile devices 204 and 206. That is, the relevant components in each include sensors and a display. Sensors 260 in device 248 and sensors 262 in device 250 may be one of various types of sensors that are able to determine the device's location and orientation relative to other device 250. There may be multiple mobile or stationary devices in the configuration shown in FIG. 2C; the two mobile devices 248 and 250 are examples. Relative physical position data 264 of mobile device 248 is obtained by remote server 246. In the described embodiment, position data 264 is transmitted to server 246. Similarly, position data 266 indicating a relative physical position of device 250 is transmitted to server 246. Rendering engine 252 processes relative physical location data 264 and 266 to create rendered pixel data. Rendered pixel data, shown as video data 268, is transmitted back to display 248 for display on monitor 272. Similarly, rendered pixel data, shown as video data 270, is transmitted back to display 250 and displayed on monitor 274. This may be done for n number of mobile or stationary displays, limited by the processing capabilities of remote server 246 and multiple-display rendering engine 252 and available transmission bandwidth. As noted above, displays 248 and 250 may not have identical sensors or have location or egomotion sensors at all. At least one of the displays should have an egomotion sensor to provide an anchor.

Figure 3C:
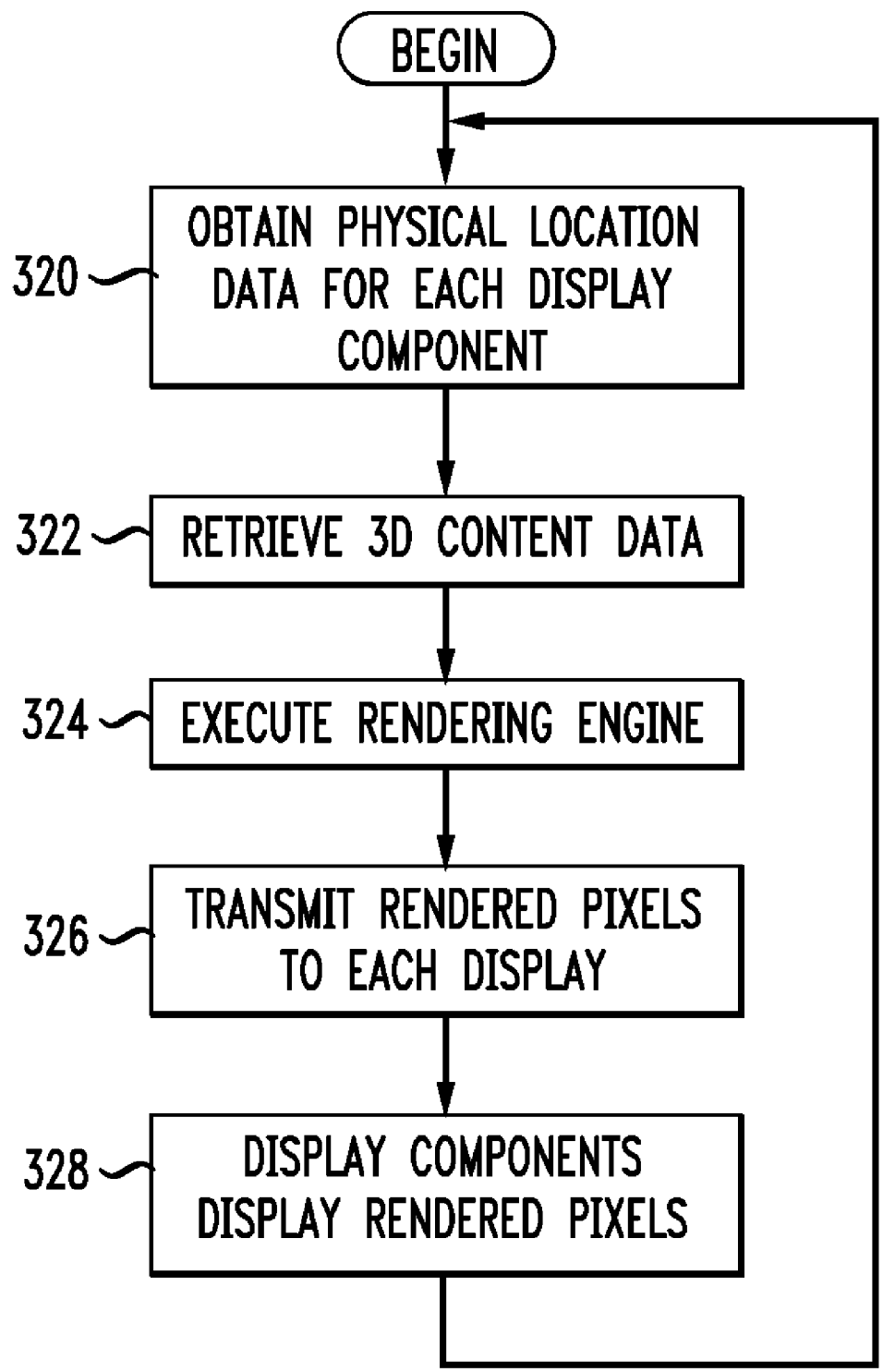

FIG. 3C is a flow diagram corresponding to components discussed in FIG. 2C and has steps that are similar to those shown in FIGS. 3A and 3B. The process described in FIG. 3C is from the perspective of remote server 246. At step 320, a remote server obtains or acquires the relative physical locations of each of the other displays, shown as displays 248 and 250 in FIG. 2C. This may be done by utilizing sensors on some or all of the displays. As noted above, at least one of the displays has an egomotion detector. Not all the displays need to have location sensors. Those that do have sensors obtain their own position in reference to the other devices (in proximity) and send the relative physical position information to remote server 246. If a peer display does not have its own sensors, a peer that does may sense the relative position of the non-sensor peer device and send this relative position data, together with its own egomotion data, to the remote server. As is known in the field, there are various ways location sensors and egomotion detectors may be used to measure the relative positions of the displays.

At step 320 these position data are obtained by the remote server. At step 322 the 3D content data is retrieved from memory on the remote server, such as local cache 256, or from network components 258, or from both. At step 324 a multiple-display rendering engine in the remote server executes. The engine accepts as input the 3D content data and the display position data received from the peer displays in proximity to each other (in this embodiment, the position of the remote server itself is not needed). It should be kept in mind that some of these displays may be stationary displays, that is, they do not all have to be mobile devices. At step 326 the rendered pixels of the 3D content created by the rendering engine are transmitted to the peer displays in a suitable form, such as a video stream, typically over a wireless connection. Once the rendered pixel data are transmitted to the one or more displays, the data is displayed at step 328 (one step in the process that does not take place on the remote server). The process repeats by returning to step 320 where the physical position data for each display is sent to the remote server.

FIG. 5 is an overview block diagram and closed interactive flow of spatially correlating multiple displays for displaying virtual world data in accordance with one embodiment. At the center of the diagram is a multiple display rendering engine 506. Virtual world coordinates or data 504 is inputted into engine 506. As noted above, data 504 may come from one or more sources. Engine 506 also takes as input relative physical display position data 502 for 1 to n display devices. As noted above, position data 502 may be in the form of location data (e.g., coordinates) and orientation data (e.g., angles). Position data 502 conveys the position of a display relative to the other displays that are in its proximity and are displaying the same virtual world coordinates. Within engine 506 are virtual cameras 508. The output of multiple rendering engine 506 are video streams that are transmitted to the displays 510. Rendering engine 506 uses virtual cameras 508 to determine the specific rendering perspectives. These virtual camera images are implemented by rendered pixel data for each display device. Virtual cameras 508 provide views into the virtual world provided by a particular display device. As the user moves a display, its relative physical position data 502 changes. The new or modified position data is input into engine 506 thereby changing virtual cameras 508. In this manner, spatial correlation of random and arbitrarily positioned displays is implemented using a closed feedback loop as shown in FIG. 5.

Figure 6A:
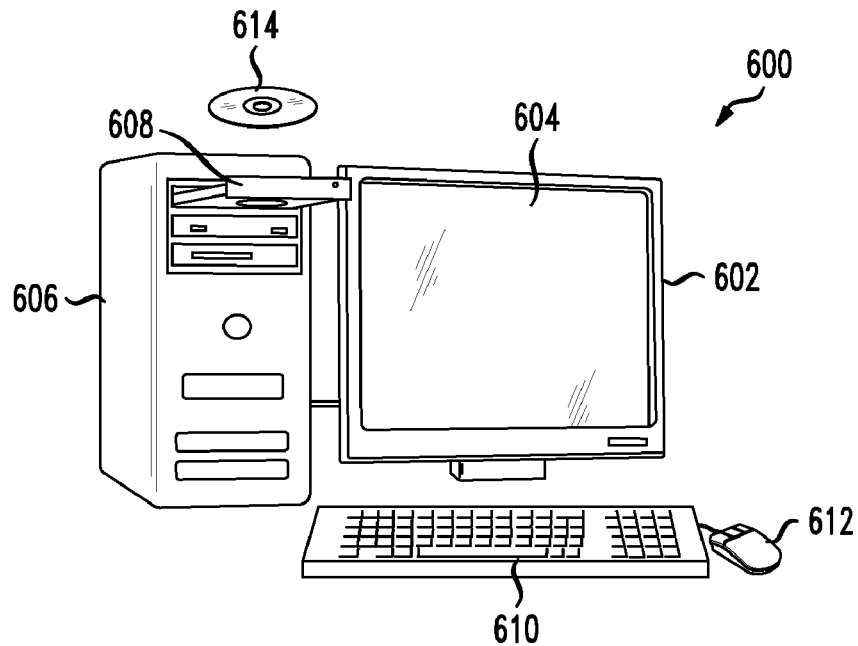
FIGS. 6A and 6B illustrate a computer system suitable for implementing embodiments of the present invention.
Figure 6B:
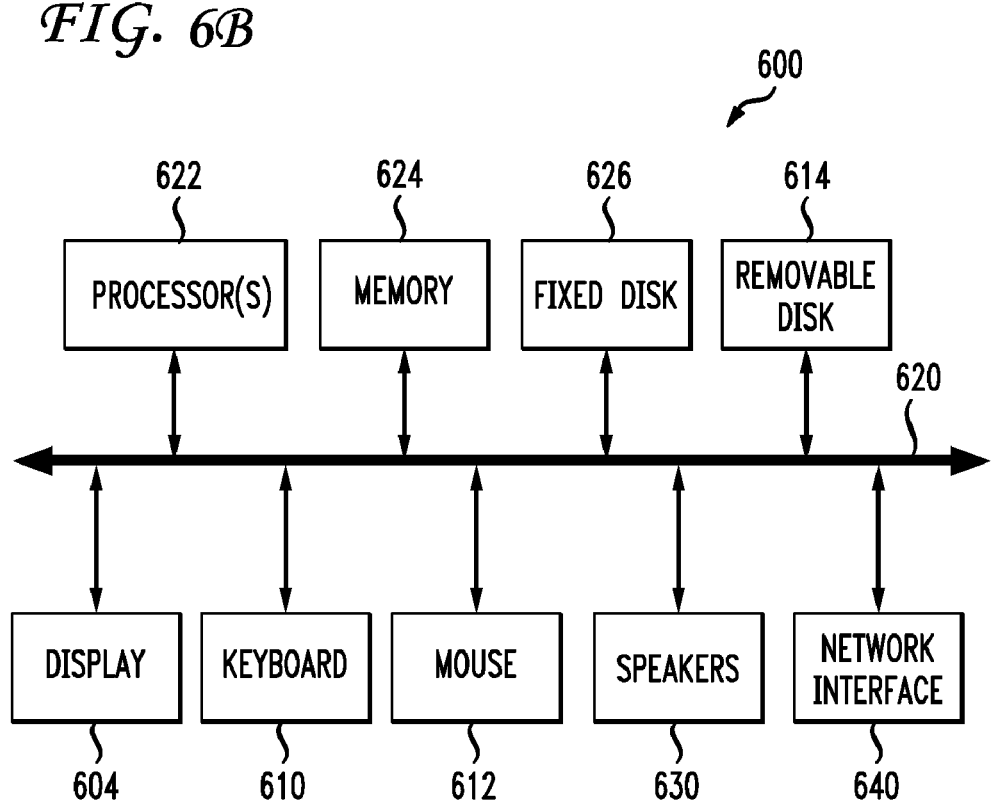

FIGS. 6A and 6B illustrate a computing system 600 suitable for implementing embodiments of the present invention. FIG. 6A shows one possible physical form of the computing system. Of course, the computing system may have many physical forms including an integrated circuit, a printed circuit board, a small handheld device (such as a mobile telephone, handset or PDA), a personal computer or a super computer. Computing system 600 includes a monitor 602, a display 604, a housing 606, a disk drive 608, a keyboard 610 and a mouse 612. Disk 614 is a computer-readable medium used to transfer data to and from computer system 600.

FIG. 6B is an example of a block diagram for computing system 600. Attached to system bus 620 are a wide variety of subsystems. Processor(s) 622 (also referred to as central processing units, or CPUs) are coupled to storage devices including memory 624. Memory 624 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 626 is also coupled bi-directionally to CPU 622; it provides additional data storage capacity and may also include any of the computer-readable media described below. Fixed disk 626 may be used to store programs, data and the like and is typically a secondary storage medium (such as a hard disk) that is slower than primary storage. It will be appreciated that the information retained within fixed disk 626, may, in appropriate cases, be incorporated in standard fashion as virtual memory in memory 624. Removable disk 614 may take the form of any of the computer-readable media described below.

CPU 622 is also coupled to a variety of input/output devices such as display 604, keyboard 610, mouse 612 and speakers 630. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 622 optionally may be coupled to another computer or telecommunications network using network interface 640. With such a network interface, it is contemplated that the CPU might receive information from the network, or might output information to the network in the course of performing the above-described method steps. Furthermore, method embodiments of the present invention may execute solely upon CPU 622 or may execute over a network such as the Internet in conjunction with a remote CPU that shares a portion of the processing.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are illustrative and not restrictive, and the invention is not to be limited to the details given herein, but may be modified within the scope and equivalents of the appended claims.

What is claimed is:

1. A method of displaying 3D content on a first display component and a second display component utilizing a host server, the method comprising:
obtaining, at the host server, first physical position data of the first display component indicating a relative position to the host server and second physical position data of the second display component indicating a relative position to the host server;
executing a multiple-display rendering engine on the host server for spatially-correlating multiple displays, the engine containing virtual cameras for determining specific rendering perspectives into a virtual world provided by the first display component and the second display component, thereby creating a first set of rendered data and a second set of rendered data;
receiving virtual world coordinates; and
transmitting the first set of rendered data to the first display component and the second set of rendered data to the second display component;
wherein the first set of rendered data is displayed on the first display component and the second set of rendered data is displayed on the second display component; and
wherein the first display component and the second display component enable a spatially correlated rendering of the 3D content and provide an extended field-of-view for a user viewing the 3D content using both the first and second display components.

2. A method as recited in claim 1 further comprising:
obtaining 3D content data representing the 3D content from a local memory on the host server.

3. A method as recited in claim 1 further comprising:
obtaining 3D content data representing the 3D content from a network component.

4. A method as recited in claim 1 wherein obtaining first physical position data and second physical position data further comprises:
receiving the first physical position data from the first display component; and
receiving the second physical position data from the second display component.

5. A method as recited in claim 1 wherein obtaining first physical position data and second physical position data further comprises:
detecting the first physical position data and the second physical position data using sensors in the host server.

6. A method as recited in claim 1 further comprising:
creating a third set of rendered data; and
displaying the third set of rendered data on the host server, wherein the host server, the first display component, and the second display component enable a spatially correlated rendering of the 3D content.

7. A method as recited in claim 1 further comprising:
sensing the first physical position data of the first display and the second physical position data of the second display, wherein the sensing is performed continuously, thereby enabling the spatially correlated rendering.

8. A method as recited in claim 1 further comprising:
executing a one-to-one mapping transformation of the first physical position data to a first virtual position and orientation data for the first display and of the second physical position data to a second virtual position and orientation data for the second display.

9. A method of displaying 3D content on a first display component and a second display component, the method comprising:
sensing a first physical position of the first display component, wherein the first physical position is relative to the second display component; and
displaying a first set of rendering data on the first display component;
sensing a second physical position of the second display component, wherein the second physical position is relative to the first display component; and
displaying a second set of rendering data on the second display component;
wherein a first physical position data of the first display component is obtained by the second display component and a second physical position data of the second display component is obtained by the first display component;
executing a multiple-display rendering engine on the first display component, the engine containing a virtual camera for determining a first specific rendering perspective for the first display component into a virtual world provided by the first display component and for determining a second specific rendering perspective for the second display component into the virtual world by the second display component;
receiving virtual world coordinates; and
wherein the first display component and second display component provide a spatially correlated rendering of the 3D content, thereby enabling an extended field-of-view for a user viewing the 3D content using the first display component and the second display component.

10. A method as recited in claim 9 further comprising:
measuring first egomotion data of the first display component.

11. A method as recited in claim 9 further comprising:
receiving second egomotion data from the second display component.

12. A method as recited in claim 11 further comprising:
propagating the first egomotion data of the first display component to the second display component.

13. A method as recited in claim 9 further comprising:
receiving second physical position data relating to the second display component.

14. A method as recited in claim 9 wherein the first display component and the second display component store the 3D content and wherein the first display component and second display component synchronize when there is a change in the 3D content.

15. A method as recited in claim 9 further comprising:
transmitting a portion of the 3D content to the second display component, wherein the first display component stores all the 3D content and the second display component initially stores no 3D content.

16. An apparatus for displaying 3D content on a first display component and a second display component, the apparatus comprising:
means for obtaining a first physical position data of the host server indicating a position relative to the second display component and a second physical position data of the second display component indicating a position relative to the host server;
means for executing a multiple-display rendering engine on the host server for spatially-correlating multiple displays, the engine containing virtual cameras for determining specific rendering perspectives into a virtual world provided by the first display component and the second display component, thereby creating a first set of rendered data and a second set of rendered data;
means for receiving virtual world coordinates; and
means for transmitting the first set of rendered data to the first display component and the second set of rendered data to the second display component;
wherein the first set of rendered data is displayed on the first display component and the second set of rendered data is displayed on the second display component; and
wherein the first display component and the second display component enable a spatially correlated rendering of the 3D content and provide an extended field-of-view for a user viewing the 3D content using both the first and second display components.

17. An apparatus as recited in claim 16 further comprising:
means for obtaining 3D content data representing the 3D content from a network component.

18. An apparatus as recited in claim 16 further comprising:
means for rendering the first set of rendered data and the second set of rendered data.

19. An apparatus as recited in claim 16 wherein means for obtaining a first physical position data and a second physical position data further comprises:
means for receiving the first physical position data from the first display component and the second physical position data from the second display component.

20. An apparatus as recited in claim 16 wherein means for obtaining a first physical position data and a second physical position data further comprises:
means for detecting the first physical position data and the second physical position data.

21. An apparatus as recited in claim 16 wherein means for obtaining a first physical position data and a second physical position data further comprises:
means for receiving the first physical position data from a first sensor on the first display component and the second physical position data from a second sensor on the second display component.

22. An apparatus as recited in claim 16 further comprising:
means for creating a third set of rendered data; and
means for displaying the third set of rendered data, wherein the apparatus, the first display component, and the second display component enable a spatially correlated rendering of the 3D content.

23. An apparatus as recited in claim 16 further comprising:
means for sensing the first physical position data of the first display and the second physical position data of the second display, wherein the sensing is performed continuously, thereby enabling the spatially correlated rendering.

24. An apparatus as recited in claim 16 further comprising:
means for executing a one-to-one mapping transformation of the first physical position data to a first virtual position and orientation data for the first display and of the second physical position data to a second virtual position and orientation data for the second display.

25. An apparatus for displaying 3D content in conjunction with a second display component, the apparatus comprising:
means for sensing a first physical position of the apparatus, wherein the first physical position is relative to the second display component;
means for displaying a first set of rendering data on the apparatus;
means for sensing a second physical position of the second display component, wherein the second physical position is relative to the first display component; and
means for displaying a second set of rendering data on the second display component;
wherein a first physical position data of the apparatus is obtained by the second display component and a second physical position data of the second display component is obtained by the first display component;
means for executing a multiple-display rendering engine on the first display component, the engine containing a virtual camera for determining a first specific rendering perspective for the first display component into a virtual world provided by the first display component and for determining a second specific rendering perspective for the second display component into the virtual world by the second display component; and
means for receiving virtual world coordinates;
wherein the apparatus and second display component provide a spatially correlated rendering of the 3D content, thereby enabling an extended field-of-view for a user viewing the 3D content using the apparatus and the second display component.

26. An apparatus as recited in claim 25 further comprising: means for creating the first set of rendering data.

27. An apparatus as recited in claim 25 further comprising: means for measuring first egomotion data of the apparatus.

28. An apparatus as recited in claim 25 further comprising: means for propagating the first egomotion data of the apparatus to the second display component.

29. An apparatus as recited in claim 25 further comprising: means for transmitting a portion of the 3D content to the second display component, wherein the apparatus stores all the 3D content and the second display component initially stores no 3D content.

* * * * *